United States Patent [19]

Stoll

[11] Patent Number: 4,470,575

[45] Date of Patent: Sep. 11, 1984

[54] CONNECTION FOR FLUID LINES AND HOSES

[76] Inventor: Kurt Stoll, Lenzahlde 72, D-7300 Esslingen, Fed. Rep. of Germany

[21] Appl. No.: 296,726

[22] Filed: Aug. 27, 1981

[30] Foreign Application Priority Data

Sep. 25, 1980 [DE] Fed. Rep. of Germany ....... 3036141

[51] Int. Cl.³ ............................................. F16L 37/28
[52] U.S. Cl. ................................ 251/149.6; 285/238; 285/322
[58] Field of Search ............... 285/238, DIG. 22, 322, 285/423; 251/149.6

[56] References Cited

U.S. PATENT DOCUMENTS

| | | | |
|---|---|---|---|
| 2,305,841 | 12/1942 | Carlson | 251/149.6 |
| 2,322,877 | 6/1943 | Parker | 251/149.6 |
| 2,327,714 | 8/1943 | Iftiger, Sr. | 285/35 |
| 2,444,414 | 7/1948 | Anderson et al. | 251/149.6 |
| 2,905,485 | 9/1959 | Zajac | 251/149.6 |
| 3,670,770 | 6/1972 | Nelson | 137/614.04 |
| 4,288,112 | 9/1981 | Stoll | 285/328 |

FOREIGN PATENT DOCUMENTS

| | | | |
|---|---|---|---|
| 867500 | 11/1941 | France | 251/149.6 |
| 1291752 | 10/1972 | United Kingdom | 251/149.6 |

*Primary Examiner*—A. Michael Chambers
*Attorney, Agent, or Firm*—Flynn, Thiel, Boutell & Tanis

[57] ABSTRACT

A connection for use with lines and hoses is designed for joining up such lines with a fluid distribution unit. The connection has a body and an endpiece at one end which may be joined up with the distribution unit and undone therefrom and at the opposite end of the body there is a female endpiece, the two endpieces being joined together fluidwise by a hole running through the body and through the endpieces. In this hole, a spring-loaded stopper is placed so that it may be axially moved out of a shut-off position on pushing a piece of line or hose into the female endpiece against the force of the spring. The female endpiece has gripping fingers, separated by narrow cutouts, such fingers having a common outer conical face on which a gripping ring may be moved axially between a gripping position and a line released position. Furthermore, the stopper and the inner wall of the body have inwardly running shoulders for limiting sliding motion of the stopper into its opened position. A gasket ring, seated in a ring-like pocket in the wall of the hole through the connection, is designed for resting fluid-tightly against the outer face of the line or hose and its side turned towards the first endpiece encases liquid-tightly a collar on the stopper in the closed condition of the connection.

12 Claims, 5 Drawing Figures

CONNECTION FOR FLUID LINES AND HOSES

FIELD OF THE INVENTION

The present invention to a connection and, more particularly, to a connection for joining up fluid lines such as hoses with a unit for distribution of such fluids to different points, the connection being made of a body with one endpiece which may be joined up with such a unit and undone therefrom, and a further, female endpiece for taking up the fluid line to be joined up with the unit, the body and endpieces having a through-hole in which a spring-biased stopper is placed so that it may be moved axially and which, on joining up the connection with the line or hose, is moved out of a shut position in which it is nearer to the female endpiece, against the force of a, the spring, into an open position in which it is further away from the female endpiece and nearer the other endpiece.

BACKGROUND OF THE INVENTION

Such a connection may, for example, be joined up with a fluid distribution unit kept permanently under a working pressure, even when it is not joined up with a fluid line. In this case the connection may be spoken of as an outlet of the distribution unit, it being shut by the stopper in it when no line is joined up. The stopper is, in fact, only opened on joining up a line. It will be clear that the fluid distribution unit, dependent upon its designed purpose, may be made for joining up with one or more such connections. In connection with the present invention, it is only the connection as such which is important.

In connections of the prior art of the sort noted, the female end has radially moving spring locking parts running into the hole through the connection and having a locking groove made in the outer face of a pipe connection part made of stiff material. This pipe connection has to be pushed into the line or hose before the same may be joined up and fixed therein, after which the pipe connection part is pushed into the female endpiece. When this is done, the locking parts are pushed outwards by the pipe connection part which are then lockingly taken up in the locking groove which is opposite thereto. At the same time, the end of the stiff pipe connection part has the effect of pushing on the stopper so that the same is opened and fluid may make its way into the pipe or hose. For undoing the pipe connection part, the locking parts are joined up with an outer, unlocking sleeve by way of an inbetween loading ring (kept in a locking position by spring force), and when the unlocking sleeve is moved, the loading ring and the locking parts therewith are moved along in an axial direction by way of a wedge face so that the wedge face comes clear of the pipe connection part.

This known design has a great number of parts to it and, for this reason, is high in price to make and is complex when used and locked and unlocked. Furthermore, joining up a line is a complex operation because the pipe connection piece has to be fixed in position beforehand, such pipe connection part being made of solid material and even further increasing the weight of the connection. Furthermore, the connection is generally large in size and for joining up and unjoining the line or hose, high forces are necessary.

SUMMARY OF THE INVENTION

For this reason, one purpose of the present invention is that of producing a connection of the indicated type having only a small number of parts and which may be cheaply produced. A further purpose of the invention is designing such a connection which may be used without any high forces being necessary.

A further purpose of the invention is that of designing a connection which may be done up and undone again safely and without any trouble.

For effecting this purpose and still further purposes, in the invention the female endpiece has gripping fingers to be placed around the end of the line, such fingers being separated by narrow cutouts running in from the free end of the endpiece, the endpiece having an at least partly conical outer face and a gripping ring thereon able to be moved between a line gripping position and a line released position. Furthermore, the stopper is placed coming right up to the end of the line so that, when the line is gripped in position by the gripping ring, the stopper is kept in its open position. Furthermore, the connection and the inner face therein placed round the wall has radially running shoulders for limiting axial motion of the stopper and keeping it in its opened position. Furthermore, there is a gasket ring resting fluid-tightly against the outer face of the end of the line placed in the connection, the gasket ring forming on its side turned away from the finger endpiece a valve seat for a valve collar on the stopper, it making fluid-tight contact with the valve collar when the stopper is in the shut-down position.

It will be seen from this that the end of the line or hose may be moved into the female part itself without the need for any pipe connection part or the like as in the prior art. In this respect, the gripping fingers are responsible for keeping the end of the line strongly in position while this part being very much simpler in design than the spring locking system of the known connection. On pushing the end of the line into the female part, the user is readily able to get the feel for the depth to which the end part has to be pushed in, because the stopper, pushed back by the end of the line, comes up against the shoulder within the body. In this respect, as well, no separate part is needed. Furthermore, the gripping ring only has to be moved into its gripping position. A further reason why the design is simpler is that only one single gasket ring is present which has two functions, that is to say on the one one hand it is forced fluid-tightly against the outer face of the end of the line radially when the end of the line has been pushed into the connection, the inside of the body of the connection then being completely shut off from the outside. On the other hand, when the line is taken out of the coupling, the stopper collar will be fluid-tightly rested again the gasket ring so that there is no possible loss of fluid under pressure through the connection. A more specially useful effect is that simply by putting the connection together without the stopper and without making any further change, the connection will be open all the time, this being necessary if, for example the connection is used for joining a stiff pipe and a flexible line or hose together.

BRIEF DESCRIPTION OF THE DRAWINGS

An account will now be given of one working example of the invention using the figures.

DETAILED ACCOUNT OF THE WORKING EXAMPLE OF THE INVENTION

Figure 1:
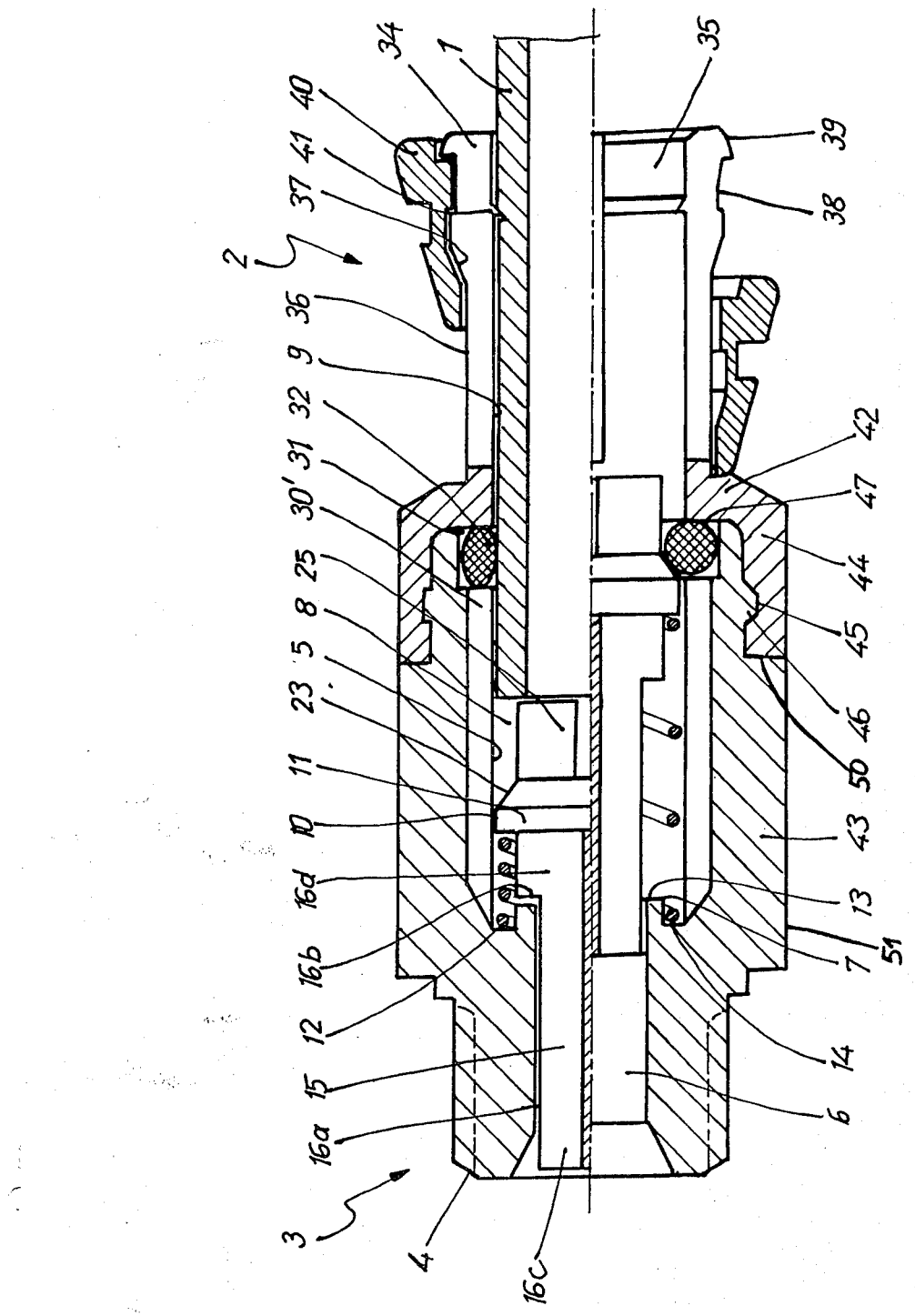
FIG. 1 is a lengthways section through a connection embodying the invention which diagrammatically in two working conditions, that is to say, shows the top half of the figure, the connection has the end of a piece of line pushed into it, while in the lower half the connection may be seen without any such line end.

The connection to be seen in the figures is designed for joining up a line, which may more specially be a hose such as synthetic resin hose, with a fluid distribution unit. To this end, the connection has a body which includes a female endpiece 2 for taking up the line 1 to be joined up, and at its other end a further endpiece 3 which has a threaded tailpiece 4, which may be screwed into a screw-threaded hole in the distribution unit, the last-named being conventional and not illustrated. Such a distribution unit may, for example, be such a unit joined up with a pressure fluid supply and having a number of connection points for, in each case, one connection, or it may take the form of one connection part with a single connection point for one connection.

The body of the connection will be seen to have its endpieces placed in line or pointing axially, and has a through-hole 5 which has a number of different parts or portions. At the first endpiece, hole 5 has a narrower hole part 6 joined up at a radial step or shoulder 7 with a wider part 8 and after such wider part 8 there is, at the female endpiece end, a female hole part 9 to take up the line 1. The wider part 8 and the female hole part 9 have the same diameter and the end of line 1 will be seen to go in as far as the wider hole part 8 when it is pushed into the female endpiece.

Figure 3:
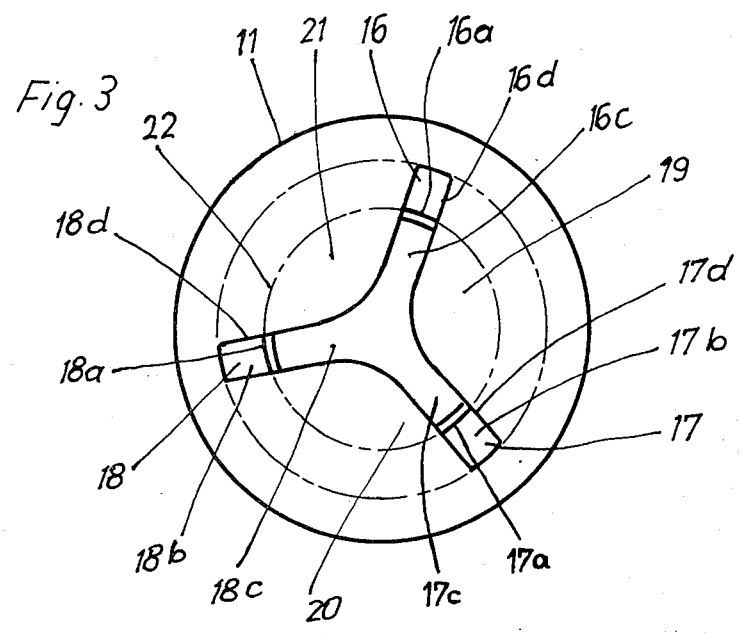
FIG. 3 is a rear end view of the stopper of FIG. 2 taken in the direction of arrow III of FIG. 2.
Figure 4:
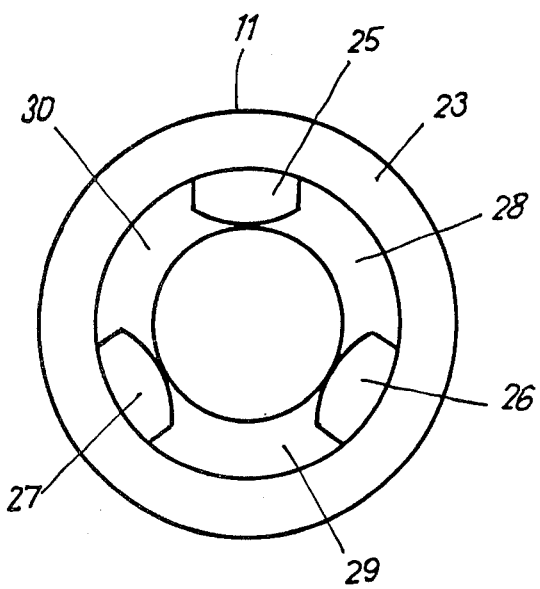
FIG. 4 is a front view of the stopper of FIG. 2 taken in the direction of arrow IV in FIG. 2.
Figure 5:
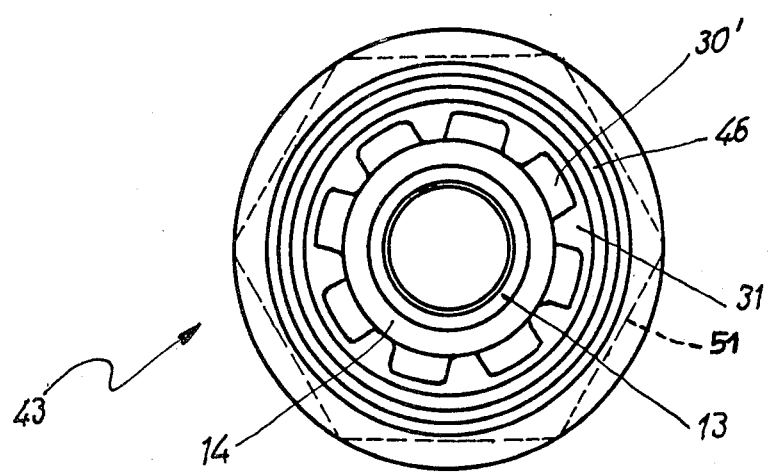
FIG. 5 is an end view of an endpiece which is a component of the connection of FIG. 1.

In the narrower hole part 6 and the wider hole part 8 of through-hole 5, a valve member or stopper 10 will be seen, which may be slipped along in an axial direction. Stopper 10 has a valve collar 11 which, at all times, is within the wider hole part 8 when the stopper 10 is moved backwards and forwards. A coil spring 12 will be seen on the left hand side of collar 11, turned towards the narrower hole part 6, one end of coil spring 12 resting against a part of the radial shoulder or skirt 7 between the two parts 6 and 8 of the hole, and it will be seen that this skirt or shoulder 7 is undercut by a ring-like pocket 14 (outside a stop face 13, which will be noted later) for taking up the spring end. The stopper 10 is guided, on the one hand, by its valve collar 11, slipping against the inner face of the wider hole part 8 and, on the other hand, by an axial tailpiece 15 resting against the inner face of the narrower hole part 6. This guiding tailpiece 15 will be seen to be extending axially from the end of the stopper 10 nearest endpiece 3. The guiding tailpiece is made up of three axially extending guiding walls (16, 17 and 18, FIG. 3), which are joined together for some axial distance on the axis of the stopper. The guide walls are, as may be seen more specially from FIG. 3, spaced by an angle of 120° between them and they have their radially outer ends 16a, 17a and 18a guidingly resting against the inner face of round hole part 6, of the connection. It will be seen that the guide walls take the form of a spider system when seen in radial section, any two of said walls walling in an axially extending groove or fluid-way 19, 20 or 21. At their ends nearer the valve collar 11, guide walls 16, 17 and 18 have, in each case, a radial skirt or shoulder 16b, 17b and 18b so that such guide walls may be seen to have an axially outer narrower part 16c, 17c and 18c and a wider axially inner part 16d, 17d and 18d. The outer lengthways ends of the narrower parts 16c, 17c and 18c will be seen to be on a limiting circle 22 (FIG. 3), which has the same diameter as the narrower hole part 6.

Figure 2:
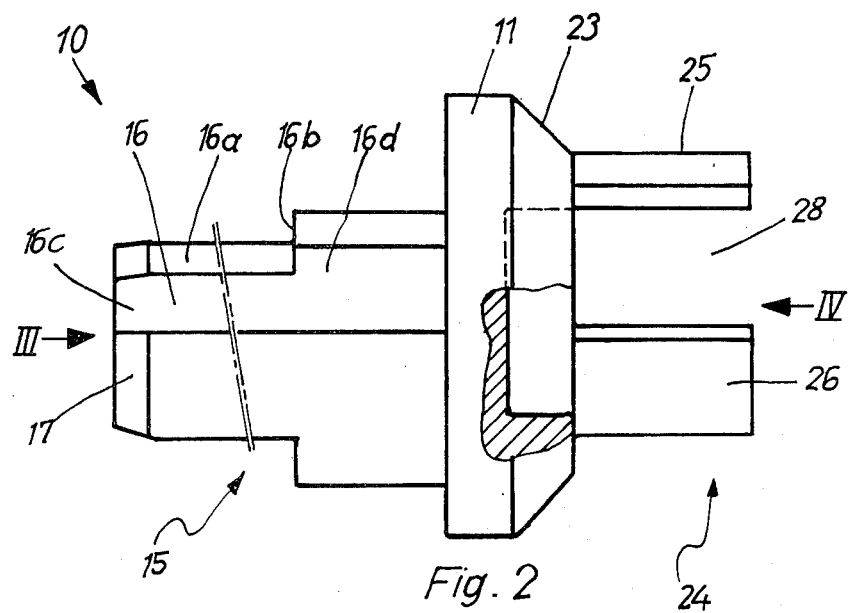
FIG. 2 is a partly cut-away side view on a larger scale of a stopper which is a component of the connection of FIG. 1.

The radial skirts or shoulders 16b, 17b and 18b are axially opposite to the radial shoulder or skirt 7 and, furthermore opposite to its radial stop-face 13, which has the form of a ring. In this way, the steps 16b, 17b and 18b take the form of stop faces on the stopper which are used with the stop face 13 on the wall of the hole through the connection. Using these stop faces, sliding motion of the stopper 10 towards the left endpiece 3 is limited. The guide walls 16, 17 and 18 coming to an end further inwards at collar 11 are made in one piece with collar 11. On the side furthest from the guide walls, wall collar 11 has a frustoconical valve face 23 and then, on the other side of this collar, that is to say the side nearer the female endpiece 2 of the connection, there is an axial headpiece 24 (FIG. 2) made up of a number of bars 25, 26 and 27 which are spaced by the same angle between them. That is to say in the present working example, it is a question of three equally angularly spaced bars. For this reason, between any two bars, there is an inbetween space 28, 29 and 30, such inbetween spaces forming openings in the headpiece 24 towards the female endpiece 2. Bars 25, 26 and 27 are, like guiding walls 16, 17 and 18, made in one piece with valve collar 11 so that a single-piece stopper 10 is produced. Such a stopper may be made very simply using synthetic resin.

In the inner face round the wider part 8 of the hole 5 through the connection, there are lengthways grooves 30' present in the material. By way of these lengthways grooves 30', the two sides of the valve collar 11 are joined together fluidwise when the valve collar has been moved into its open position towards left hand endpiece 3. The lengthways grooves 30' are designed running towards the female endpiece 2 as far as a ring-like pocket 31 for a gasket ring 32. Next to this ring-like pocket 31 on the right hand side there is the female or take-up part 9 of through-hole 5.

Female endpiece 2 has plurally axially extending gripping fingers two of which are shown at 34 and 35, ringing the end part 1 of the line, the gripping fingers being evenly spaced round the line 1. The fingers are separated by narrow slots or cutouts 36, extending axially in from the right hand end of endpiece 2. The outer face (or outer faces) of the gripping fingers 34 and 35 has, further to the left, that is to say further towards the body of the connection, a cylindrical part 36 while further to the right of this there is a conical part 37 after which, still further to the right, there is a part with a low slope having a locking groove 38 and an outer ring stop 39. On the gripping fingers 34 and 35 an axially moving gripping ring 40 is seated, ring 40 being able to be moved between a loose position (lower half of FIG. 1) and a gripping position (top half of FIG. 1). The inner face of gripping ring 40 is designed so as to be the same in form as the outer face of the gripping fingers. If the gripping ring 40 is in its loose position, the gripping fingers 34 and 35 are pushed outwards somewhat due to the inherent elasticity thereof. If the gripping ring is moved towards the free end, it will have the effect of pushing the fingrs radially inwards when it comes up against the conical part 37 of the fingers. On further moving it into the gripping position, the gripping ring will be locked in the locking groove 38 because it has a locking tooth of the right design and, in this case, it will be kept in position for stopping any undesired axial motion. A further way of stopping axial motion out of position is produced by the radial elastic force of the fingers against the inner side of the gripping ring. The outer ring stop 39 is used for stopping any undesired pulling off of the gripping or locking ring. On the inner sides of the gripping fingers 34, 35, forming the inner face of the hole part 9, there are teeth 41 stretching round the axis of the connection and designed for biting into the material of the line 1.

When the line 1 is not put in the female endpiece (see lower half of FIG. 1), the stopper 10 is forced by spring 12 towards female endpiece 2 so that its conical wall face 23 will be resting against gasket ring 32 and in this way any gas or liquid (that is to say any fluid) coming from the left hand endpiece 3 is only able to make its way to the narrow hole part 6 and into the wider hole part 8 of hole 5. The valve collar 11 will, for this reason, be seen to have cut off the flow of fluid towards the outside by working with the gasket ring 32 in the working position of the stopper 11 which is nearer to the female endpiece 2, so that there is no chance of loss of fluid to the outside. If now a line 1 is to be joined up, the end thereof is pushed inbetween the fingers 33, the end face of the line or hose then coming up against the bars 25, 26 and 27 so that stopper 10 is moved against the force of spring 12 into its open position with respect to the fluid, such open position of the stopper being one nearest to the left hand endpiece 3. If now the wall of the line 1 comes into a position near the gasket ring 32, the last-named will be forced radially outwards and the gasket ring will now make fluid-tight contact, (because of the radial force thereon) on the one hand, on the line and, on the other hand, on the opposite face of the ring-like pocket 31. Because of this, the fluid under pressure is not able to make its way in the parts 6 and 8 of the hole to the outside. At the end of the operation of pushing the end of the line into the female end piece, shoulders 16b, 17b and 18b of the guiding walls of the stopper 10 will come up against the stop face 13 facing the inside of the connection. When this position has been reached, the gripping or locking ring 40 is moved out of its loose position into the outer gripping position so that the line is fixed in position by the fingers, this process being helped along by the tooth 41 biting into the outer face of the line. For joining up the line, it will be seen that from this that it is only necessary for it to be pushed into the female part and for the gripping ring to be moved into the locking position. Then fluid under pressure is able to make its way by way of the fluid ways 19, 20 and 21 stretching in the length-direction between the guiding walls 16, 17 and 18, through the lengthways grooves in the inner face of the wider hole part 8 and by way of inbetween spaces 28, 29 and 30 between the bars 25, 26 and 27 into the inside part of line 1, all this being possible because the stopper 10 is in its unlocked position.

It will be clear that the path going by way of the lengthways fluid ways 19, 20 and 21, the lengthways grooves 30' and the inbetween spaces 28, 29 and 30 for the fluid may be designed in some other way, for example a design in which the guide walls come to an end at steps or shoulders 16b, 17b and 18b. In this case, the collar forming the stop face 13 turned towards the female endpiece would have openings or cutouts. It would furthermore be possible for the spaces between the walls 25, 26 and 27 to have their place taken by openings in the walls themselves, such openings being shut off at the edges.

The housing of the connection is made in two parts, that is to say on the one hand a first part 42 forming the female endpiece 2 with the gripping fingers 33, and, on the other hand, of a second part 43 having the left hand endpiece 3. The first part 42 has, next to the gripping fingers 33 a generally cylindrical bell-like part 44 or skirt placed round the right hand end of the second part 43 and joined therewith, for which purpose cylindrical bell-like part 44 has an inner round keyway 45 taking up a key 46 on the second part 43 so that the two parts 42 and 43 are keyed together. If necessary, may be so designed that they may be separated again. The ring-like pocket 31 taking up the gasket ring 32 is let into the end of the second part 43 and gasket ring 32 is positioned resting against a generally radial face 47 or floor of bell-like part 44.

Using the connection of the invention, it is possible for lines or hoses to be joined up without any special fittings such as crimped-on rings or "olives". It is naturally possible, however, for the line to be joined up with the connection by way of a piece of pipe or joining fitting, for example if lines with different diameters are to be joined with the same connection. Furthermore, the force needed for joining up the line with the connection and unjoining it is small so that handling is made simpler. Furthermore, the overall size of the connection is small so that a large number of them take up little space. In this respect, even if such connections are placed very near each other, it is still possible for the gripping ring 40 to be moved freely. A further useful effect of the invention is that the connection only has a small number of separate parts, in the present working example six parts, so that the connection may be more readily produced and put togethr. Furthermore, it is more readily put together because the body is made in two pieces joined together by a system with a springing lock effect or detent. Materials which may be used are for example high impact polyacetal, glass fiber reinforced polyamide, perbunane, and high alloy steels, that is to say high quality materials so that trouble with corrosion is unlikely and the connections of the invention may be used for a great number of different purposes with different pressures and different sorts of fluids. A further useful effect is that the weight of the connection is low.

It is lastly to be noted that it is only necessary to take out the stopper 10 and the spring 12 for changing the connection so that it is open at all times and, in this case, the stop face 13 turned towards the female endpiece may be used as a stop for the end face of the pushed-in end of the line or hose. The outer diameter of the second body part 43 is the same as the outer diameter of the cylindrical bell-like part 44 of the first body part 42 and the end face of the last-named comes up against a radial skirt or shoulder 50 of the second part 43. On the outside of the second part 43, there are six flats at 51 to take the form of a hex nut, which is axially spaced from the gasket ring 32 and placed in the position where the parts 6 and 8 of the hole in the body are joined.

The embodiments of the invention in which an exclusive property or privilege is claimed are defined as follows:

1. A connecting device which is adapted to be releasably connected directly to a hose, comprising a body having a bore therethrough; first fastening means on said body in the region of one end of said bore; second fastening means on said body in the region of the other end of said bore; an annular seal disposed within and supported on an inner surface of said bore and having an inside diameter approximatey equal to the outside diameter of the hose, said annular seal sealingly engaging the exterior surface of the hose and said first fastening means being adapted to releasably grip the hose when an end of the hose is inserted in said one end of said bore; a valve member supported in said bore between said other end of said bore and said annular seal for axial movement between a closed position in which a sealing surface thereon sealingly engages said annular seal so that said valve member obstructs fluid flow through said bore and an open position in which said valve member is axially spaced from said annular seal and fluid can flow through said bore past said valve member and annular seal; and resilient means for yieldably urging said valve member toward said closed position; wherein said valve member has a projection thereon which extends axially toward said one end of said bore and is adapted to engage the end of the hose, the hose engaging said projection on said valve member and moving said valve member toward said open position against the urging of said resilient means when the end of the hose is inserted into said one end of said bore; wherein said valve member has an elongate tailpiece thereon which extends axially toward said other end of said bore and is slidingly supported in a first portion of said bore; including means defining a channel for facilitating the flow of fluid through said bore past said tailpiece; wherein said first portion of said bore is adjacent said other end of said bore; wherein said bore includes a secnd portion which is of larger diameter than said first portion and is connected to said first portion by a generally radially extending annular shoulder; wherein said valve member has a diameter substantially equal to and is axially slidably supported in said second portion of said bore, said tailpiece having a diameter substantially equal to that of said first portion of said bore; and wherein said tailpiece has thereon at a location spaced from said valve member an axially facing shoulder which is engageable with said annular shoulder of said bore to limit axial movement of said valve member away from said annular seal against the urging of said resilient means.

2. The connecting device according to claim 1, wherein said means defining a channel includes a plurality of circumferentially spaced, axially extending grooves provided in said tailpiece.

3. The connecting device according to claim 1, including a plurality of axially extending grooves provided in the surface of said second portion of said bore, said grooves providing fluid communication between opposite sides of said valve member when said valve member is in said open position.

4. The connecting device according to claim 1, including an annular groove provided in a radially outer portion of said annular shoulder of said bore, and wherein said resilient means includes a helical compression spring which encircles said tailpiece, has one end disposed in said annular groove, and has the other end disposed against said valve member.

5. The connecting device according to claim 1, including three said projections which are provided at angularly spaced locations on said valve member.

6. The connecting device according to claim 5, wherein said valve member, tailpiece and projections are integral and made of a synthetic resin.

7. The connecting device according to claim 1, wherein said sealing surface on said valve member is of frustoconical shape.

8. The connecting device according to claim 1, wherein said second fastening means includes an externally threaded surface on said body.

9. The connecting device according to claim 1, wherein said body includes two endpieces which are releasably coupled to each other and which have a portion of said bore extending therethrough, said annular seal being located at the joint between said endpieces and effecting a fluid-tight seal therebetween.

10. The connecting device according to claim 1, wherein said tailpiece of said valve member includes a plurality of angularly spaced, axially and radially extending guide walls which each have a radially outer edge which slidably engages said first portion of said bore.

11. A connecting device which is adapted to be releasably connected directly to a hose, comprising a body having a bore therethrough; first fastening means on said body in the region of one end of said bore; second fastening means on said body in the region of the other end of said bore; an annular seal disposed within and supported on an inner surface of said bore and having an inside diameter approximately equal to the outside diameter of the hose, said annular seal sealingly engaging the exterior surface of the hose and said first fastening means being adapted to releasably grip the hose when an end of the hose is inserted in said one end of said bore; a valve member supported in said bore between said other end of said bore and said annular seal for axial movement between a closed position in which a sealing surface thereon sealingly engages said annular seal so that said valve member obstructs fluid flow through said bore and an open position in which said valve member is axially spaced from said annular seal and fluid can flow through said bore past said valve member and annular seal; and resilient means for yieldably urging said valve member toward said closed position; wherein said valve member has a projection thereon which extends axially toward said one end of said bore and is adapted to engage the end of the hose, the hose engaging said projection on said valve member and moving said valve member toward said open position against the urging of said resilient means when the end of the hose is inserted into said one end of said bore; wherein said valve member has an elongate tailpiece thereon which extends axially toward said other end of said bore and is slidingly supported in a first portion of said bore; including means defining a channel for facilitating the flow of fluid through said bore past said tailpiece; and wherein said first fastening means includes means defining a collet, including a plurality of circumferentially spaced and axially extending slots in said body at said one end of said bore which define a plurality of axially extending collet arms, the outer end of each said collet arm being resiliently flexible in a generally radially inward direction, and each said collet arm having near the outer end thereof and on an outwardly facing surface thereof a generally frustoconical surface portion, and including a clamping ring encircling and axially slidably supported on said collet arms for movement between a locking position and a release position, said clamping ring being cooperable with said frustoconical surface portion on each said collet arm for deflecting the ends of said collet arms radially inwardly as said clamping ring is moved from said release position to said clamping position, whereby when the end of the hose is inserted in said one end of said bore and said clamping ring is in said clamping position, said collet arms releasably grip the hose.

12. The connecting device according to claim 11, wherein each said collet arm has on a radially inwardly facing surface thereof a radially inwardly projecting tooth.

* * * * *